July 1, 1930.    R. H. ANDREWS    1,769,408
ANT POISON FEEDER
Filed Aug. 29, 1928

INVENTOR.
ROBERT H. ANDREWS
BY Joseph B. Gardner
HIS ATTORNEY.

Patented July 1, 1930

1,769,408

UNITED STATES PATENT OFFICE

ROBERT H. ANDREWS, OF OAKLAND, CALIFORNIA, ASSIGNOR OF FORTY-NINE ONE-HUNDREDTHS TO ELSWORTH MAXFIELD, OF OAKLAND, CALIFORNIA

ANT-POISON FEEDER

Application filed August 29, 1928. Serial No. 302,657.

The invention relates to a container for feeding liquid poison or insecticide to ants and other insects.

An object of the invention is to provide a feeder of such construction that while the poison content is at all times accessible to the ants such content cannot spill or be accidentally or purposely removed from the feeder.

Another object of the invention is to provide a feeder of the character described which will be extremely simple in construction and may be made at low cost.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Receptacles heretofore used for feeding poison to ants or other insects have in general had one main drawback in that the poisonous contents were invariably exposed in a manner which rendered the same readily accessible to fowls and animals. In some cases while the feeders were of a construction which prevented such undue exposure, there was always the danger that the feeder would become displaced in such manner as to permit the contents to spill. Furthermore, in most instance when the feeders became displaced they would frequently assume a position in which access to the interior thereof by the ant was completely shut off, so that even though the contents might still be retained in the receptacle, the latter was, while thus disposed, rendered entirely useless in so far as functioning as a feeder is concerned. In addition to the foregoing, practically all feeders as heretofore constructed permit of the feeder being easily opened for refilling purposes, thus, while affording an advantage from one point of view, proving a serious menace to children unwittingly playing with the feeders. However, with a feeder constructed in accordance with my invention, the foregoing disadvantages are entirely eliminated and the desired element of safety and efficiency of operation is assured.

Figure 1:
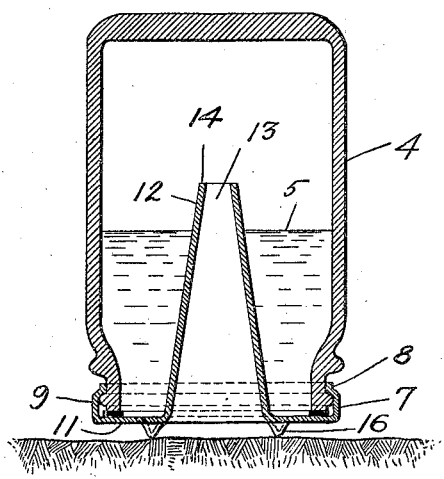
Figure 1 is a longitudinal sectional view taken through the feeder of my invention, the plane of the section being indicated by the line 1—1 of Figure 2.
Figure 2:
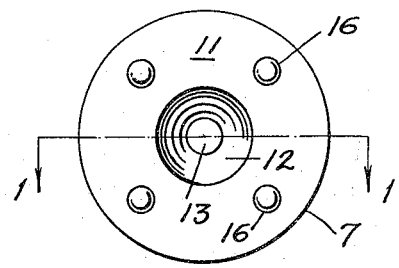
Figure 2 is an end view of the feeder shown in Figure 1, the view being from the entrance end.

In the embodiment of my invention illustrated in Figures 1 and 2, the feeder comprises a cylindrical receptacle 4 preferably made of glass so as to be impervious to the action of the liquid poison 5 which the receptacle is arranged to contain. Positioned at the open end of the receptacle is a feeder member 7, here shown provided with an annular flange 8 arranged to engage a shoulder 9 extending around the receptacle whereby a permanent and liquid tight joint may be had between the receptacle and said member.

Preferably formed as a part of the closure wall 11 of the member 7 and arranged to extend inwardly into the receptacle is a tube 12 open at both ends and affording an entrance passage 13 for the ants to the interior of the feeder. The tube, as here shown, converges inwardly and its inner end is disposed in the receptacle beyond the middle thereof. Also preferably formed integral with member 7 are legs 16 which extend outwardly therefrom and are arranged to serve as a means for supporting the feeder in spaced relation to the ground so that when the feeder is disposed in the position shown in Figure 1, the ants may crawl under the feeder and climb up the passage 13.

The liquid poison is introduced into the feeder through the passage 13, and in the use of the device the receptacle is filled about one-third full of the liquid poison so that with the parts of the feeder of the relative size and shape illustrated, none of the poison can escape or spill, no matter what position the feeder may be disposed in. Thus if the feeder is tipped and rests on the cylindrical sides of the receptacle, the level of the liquid will be below the end 14 of the passage and no liquid will escape therethrough, it being noted that free access to the passage is permitted while the feeder is thus positioned as well as in the upright position illustrated. That the ants have ready access to the intake passage and that the contents will not escape when the feeder is completely inverted from the position illustrated, is of course obvious.

The inner end 14 of the tube is preferably of such size as to preclude a child from inserting any of its fingers therethrough, and since the closure member 7 is permanently secured in position, there will be no danger of a child obtaining access to the poisonous content of the feeder in toying with the latter.

Figure 3:
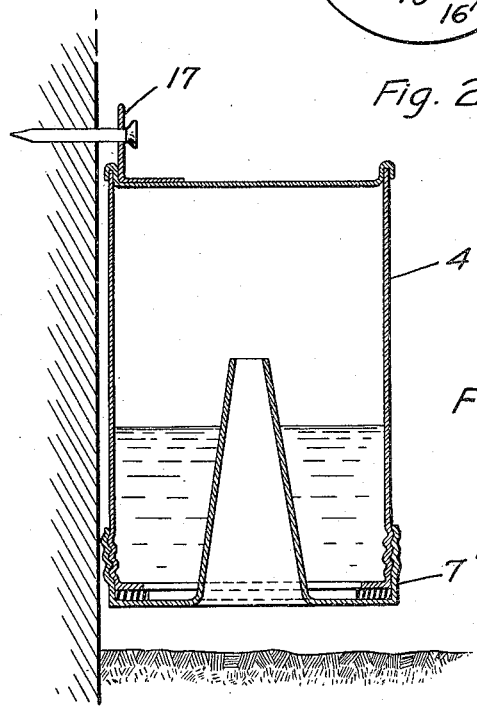
Figure 3 is a longitudinal sectional view of a somewhat modified form of the feeder.

In Figure 3, I have shown a slightly modified form of the feeder. In this embodiment the receptacle 4' is preferably made of metal and is provided with a tongue 17 which serves as a means of attaching the feeder to a wall 18 or the like. The closure member 7' may here be removably secured in position since the feeder is arranged for attachment to a wall, and the accidental removal of the closure member or its removal by a child will not be apt to occur.

I claim:

1. An ant poison feeder comprising a receptacle arranged to contain poison in liquid form and having an open end, a separate closure for said end having an integral flange arranged in sealing engagement with the receptacle, said closure having an opening therein, a tubular member formed integral with said closure and extending inwardly into the receptacle from around the sides of said opening to define a passage from the exterior to the interior of the receptacle, and legs formed integral with the closure and for supporting the receptacle with the intake end of said passage spaced from a supporting surface.

2. An ant poison feeder comprising a receptacle having an open end, a feeder member disposed at said end and provided with an opening at the center thereof and with means at its edges for permanently fixing the feeder on and forming a liquid tight seal with the receptacle, a tube formed integral with the feeder and having converging walls extending inwardly into the receptacle from around the sides of said center opening to define a passage from the exterior to the interior of said receptacle, and legs formed integral with and projecting outwardly from said feeder for supporting the receptacle with the intake end of said tube in spaced relation from a supporting surface for the feeder.

In testimony whereof, I have hereunto set my hand at Oakland, California, this 13th day of August, 1928.

ROBERT H. ANDREWS.